United States Patent [19]
Sieurin

[11] 3,761,003
[45] Sept. 25, 1973

[54] FLAT CHAIN GUIDE
[75] Inventor: Donald Sieurin, Northboro, Mass.
[73] Assignee: Morgan Construction Company, Worcester, Mass.
[22] Filed: June 28, 1971
[21] Appl. No.: 157,750

Related U.S. Application Data
[63] Continuation of Ser. No. 787,073, Dec. 26, 1968, abandoned.

[52] U.S. Cl. ............................................. 226/172
[51] Int. Cl. .......................................... B65h 17/24
[58] Field of Search ................... 226/171, 172, 173; 198/203

[56] References Cited
UNITED STATES PATENTS
| | | | |
|---|---|---|---|
| 2,792,104 | 5/1957 | Biedess | 198/203 |
| 2,736,425 | 2/1956 | Fisk | 226/172 |
| 3,106,325 | 10/1963 | Kitching | 226/171 |

FOREIGN PATENTS OR APPLICATIONS
429,584  7/1967  Switzerland......................... 226/172

Primary Examiner—Richard A. Schacher
Attorney—C. Yardley Chittick et al.

[57] ABSTRACT

An apparatus for propelling a product length moving axially along a given path. The apparatus includes endless flat-surfaced flexible chains positioned on either side of the path. Each chain is supported on a set of spaced sprockets with the rotational axes of the sprockets supporting one chain being offset along said path relative to the rotational axes of the sprockets supporting the other chain. A piston and cylinder unit is employed to move one chain towards the other so as to grip the product length passing therebetween, and the chains are driven at a linear speed which is at least equal to that of the product length passing therebetween.

1 Claim, 8 Drawing Figures

INVENTOR
DONALD SIEURIN

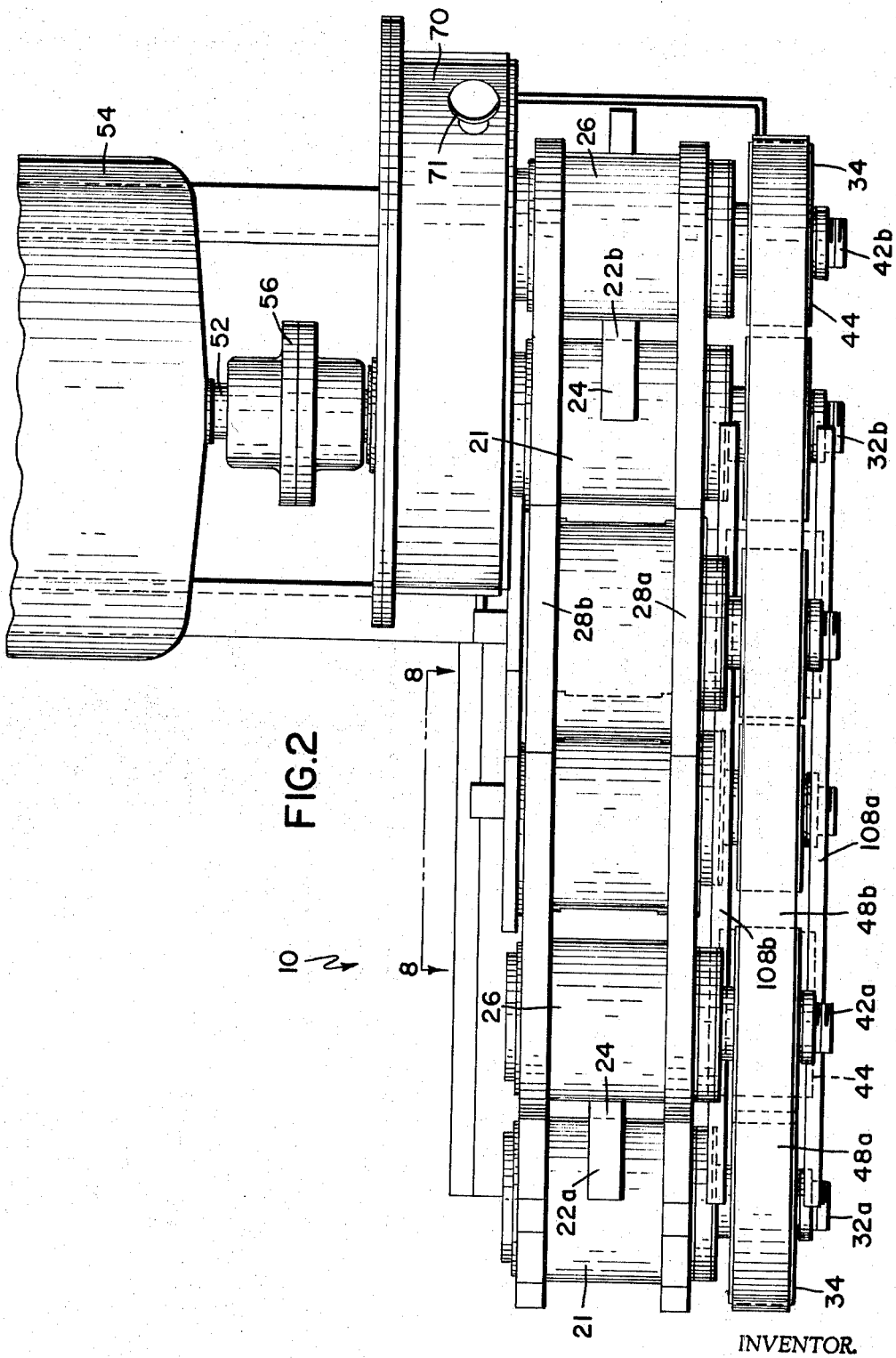

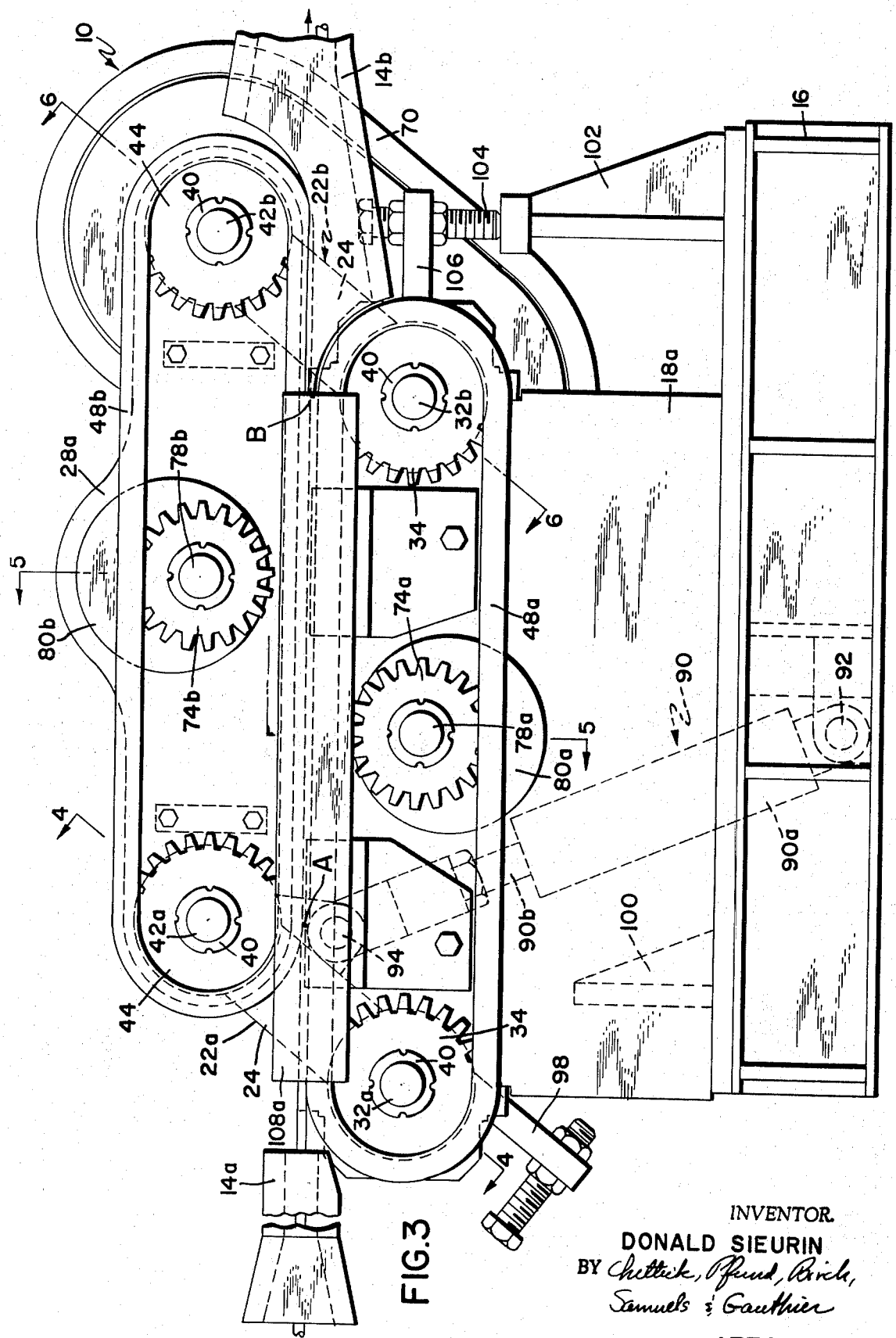

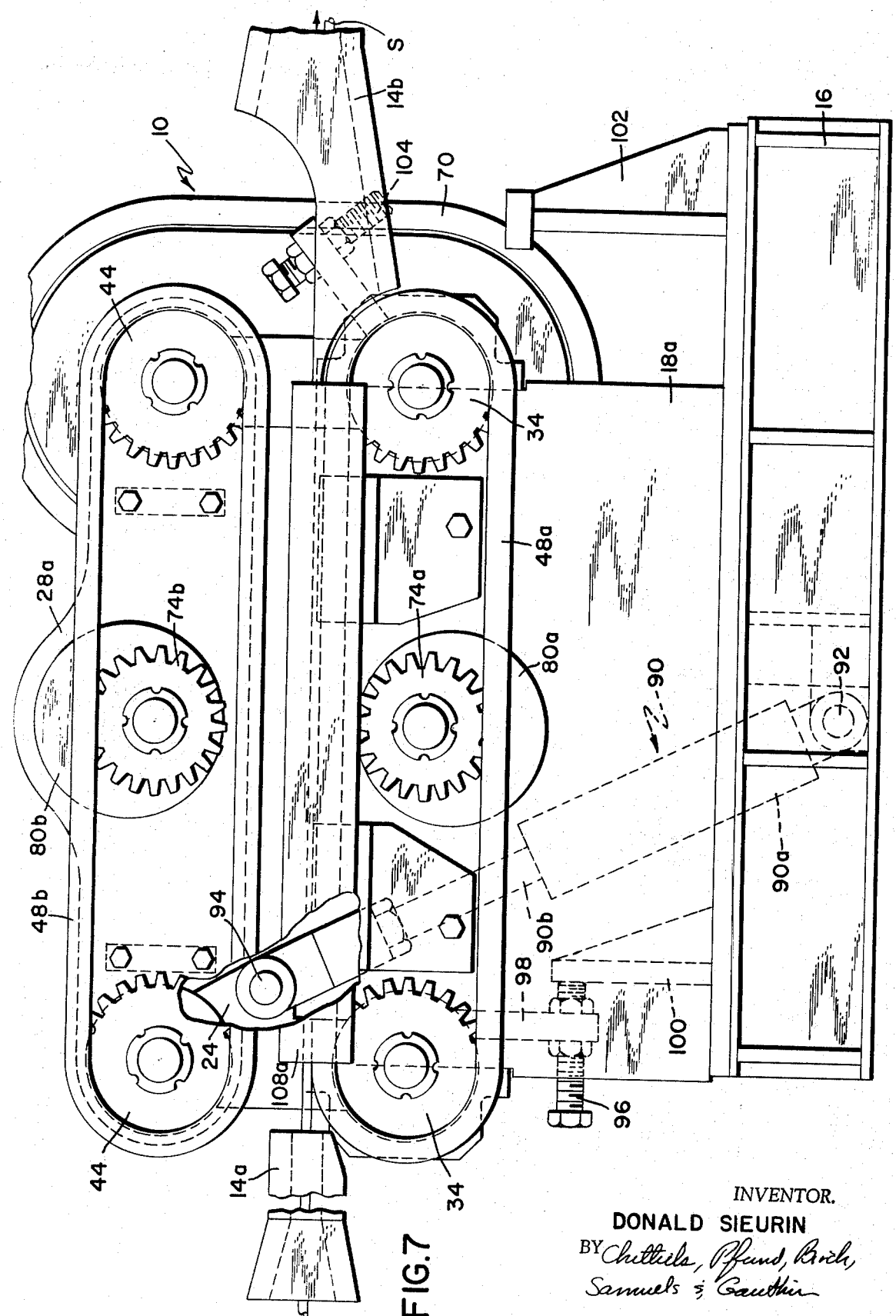

FLAT CHAIN GUIDE

This application is a continuation of U. S. Application Ser. No. 787,073 filed Dec. 26, 1968, now abandoned.

DESCRIPTION OF THE INVENTION

This invention relates generally to an apparatus for handling elongated elements, and more particularly to a means for axially propelling such elements along a given path.

The invention will hereinafter be described in connection with the handling of product lengths such as the hot rolled stock emerging from a rolling mill. However, reference to this particular use is for illustrative purposes only, and it is to be understood that the invention may be employed in other uses of a generally similar nature.

The hot rolled product of a rolling mill is usually directed from the last roll stand through water cooled delivery pipes to a reeling device. The reeling device may be either of the pouring or laying type, depending on the type of stock being handled. The stock is driven forward by the rolling action of the mill until such time as the tail end leaves the last stand. There-after, absent any auxiliary drive means between the last roll stand and the reeling device, the forward momentum of the stock will be dissipated rapidly by the frictional resistance encountered in the delivery pipes. If the linear speed of the stock is allowed to drop appreciably below the rotational speed of the reeling device, the reeling device will begin exerting a pulling action on the stock, and this in turn will create serious problems. For example, where pouring reels are being employed to accumulate bar stock in coil form, the tension developed in the tail end will cause the stock to be wrapped tightly around the reel pins. This bends the stock and frequently necessitates scrapping a length of stock roughly equal to the distance between the last roll stand and the pouring reel. Bending of the stock around the reel pins also distorts the upper end of the resulting coil and complicates removal of the coil from the reel.

In an attempt at overcoming these problems, it has heretofore been proposed to provide auxiliary drive means between the last roll stand and the reeling device for the purpose of propelling the tail ends through the delivery pipes. These devices employ oppositely disposed driven pinch rolls between which the stock is directed by suitable guide means. Although such auxiliary devices have been effective in overcoming the problems associated with a drop in the speed at which tail ends are delivered to the reeling device, their use has created other serious problems. More particularly, it has been found that because the area of contact between the stock and the oppositely disposed pinch rolls is relatively small, considerable nip pressure must be employed in order to obtain the driving force necessary to propel the stock at a speed equal to mill delivery speed. This in turn results in the surface of the stock being marked to an extent such that it frequently becomes necessary to scrap the entire length of product contacted by the pinch rolls.

The foregoing problems and disadvantages have now been overcome in a novel manner by the present invention, a general object of which is to provide an improved means for propelling a length of stock moving axially along a given path, without marking the surface of the stock. This is accomplished by gripping the stock between oppositely disposed endless flexible drive members, each of which is mounted on a set of spaced rotatable elements. The flexible drive members are tensioned and driven at a speed equal to that at which the stock is to be delivered to the next operation, and the rotatable elements supporting one drive member are offset along the path of stock travel with respect to the rotatable elements supporting the other drive member. With this arrangement the stock is gripped along a section of its length between the flexible drive members rather than between two oppositely disposed rolls. The area of contact between the stock and drive members is thus considerably greater than that provided with the pinch rolls, making it possible to materially decrease the pressure exerted on the stock. Also, at least one of the oppositely disposed drive members contacting the stock is always in a flexible condition due to the aforementioned offset of the supporting rotatable elements.

A further object of the present invention is to provide an improved means for tensioning the flexible drive members contacting the stock.

These and other objects and advantages of the present invention will become more apparent as the description proceeds with the aid of the accompanying drawings, in which:

FIG. 2 is another plan view on an enlarged scale of the chain guide shown in FIG. 1;

FIG. 3 is a view in side elevation of the chain guide shown in FIG. 2;

Figure 8:
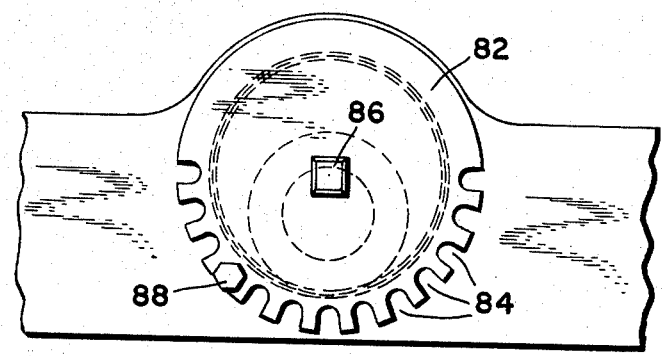
Figure 4:
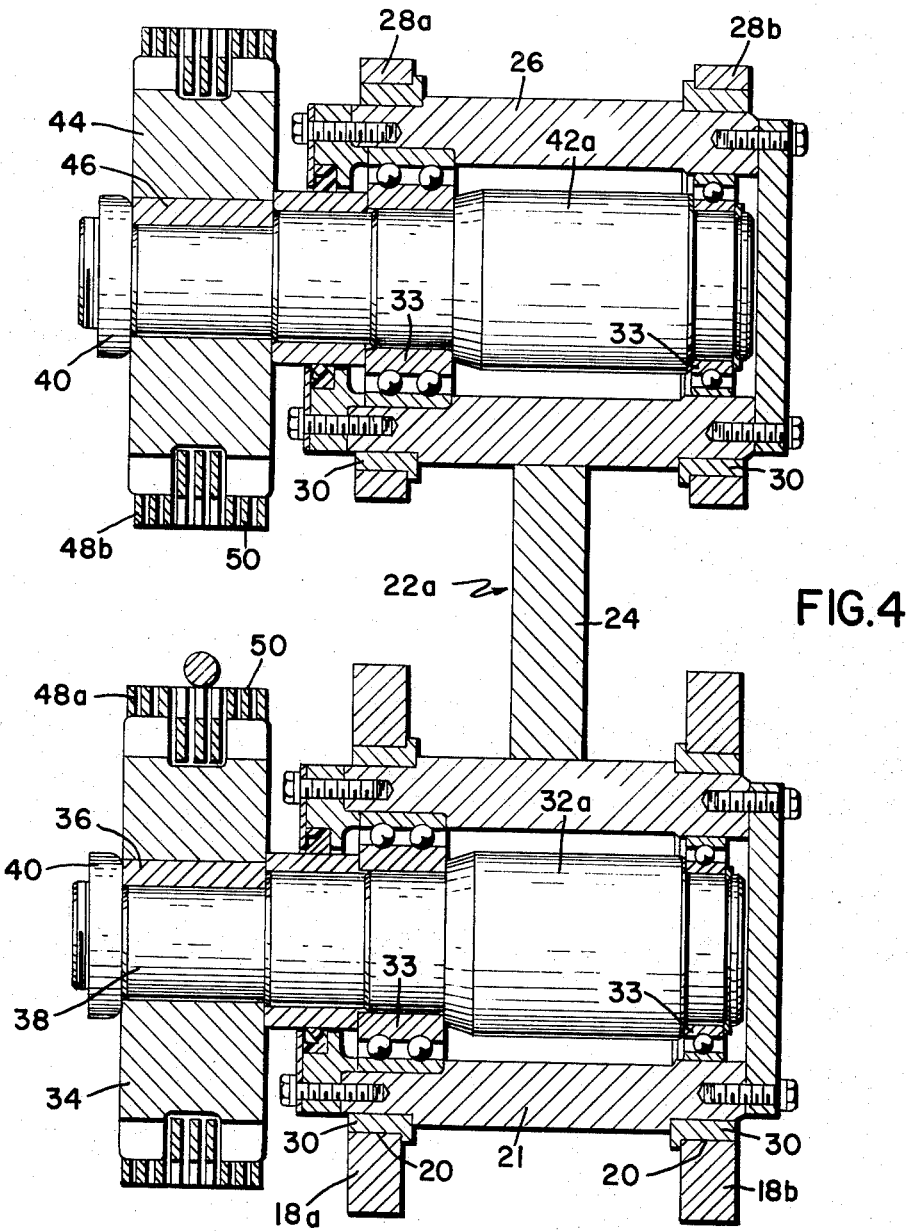
Figure 5:
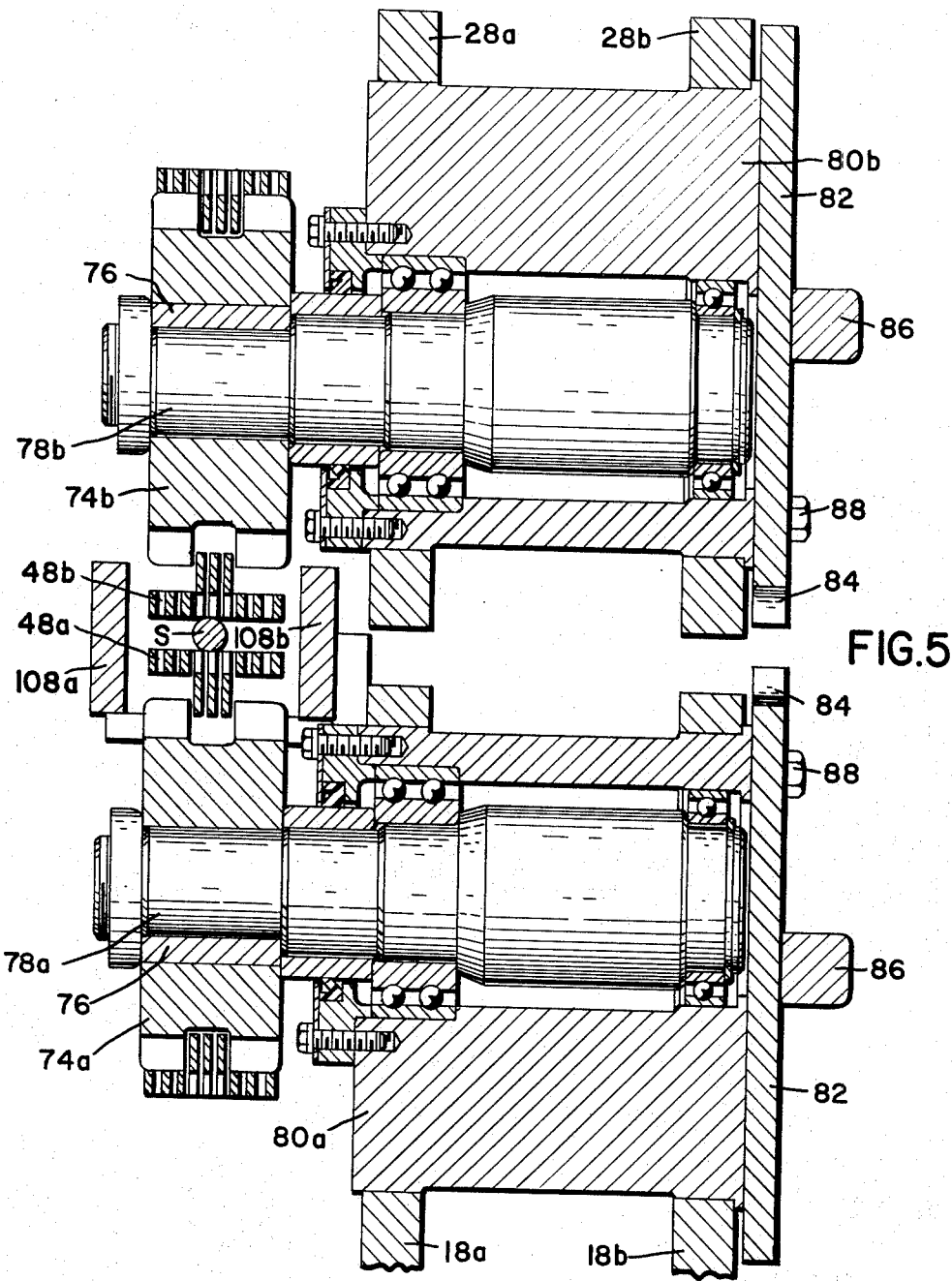
Figure 6:
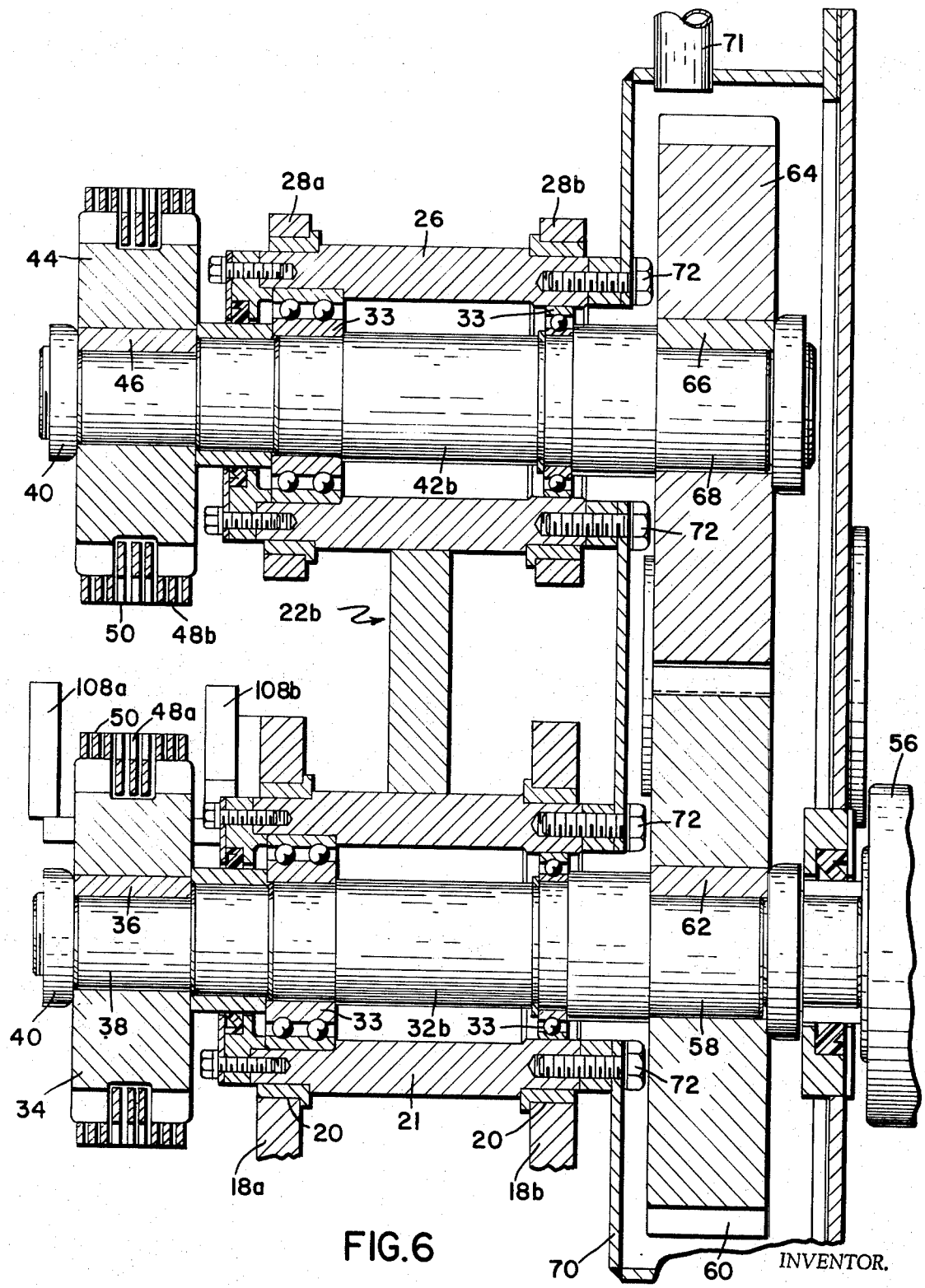

FIGS. 4, 5 and 6 are sectional views taken along lines 4—4, 5—5, and 6—6 of FIG. 3;

FIG. 7 is a view in side elevation similar to FIG. 3 showing the apparatus in an inoperative position; and, FIG. 8 is a view in side elevation along lines 8—8 of FIG. 2 illustrating the eccentrically operated means for tensioning the endless flexible drive members.

Figure 1:
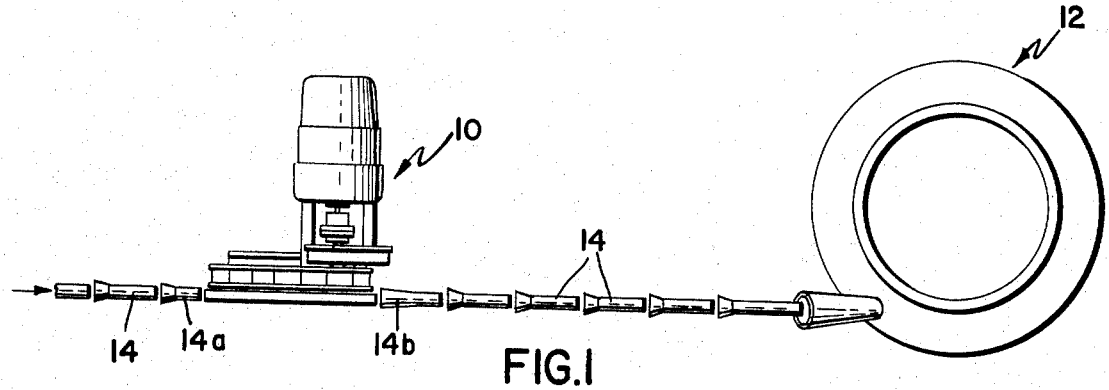
FIG. 1 is a plan view on a reduced scale showing a chain guide constructed in accordance with the present invention positioned directly upstream from a reeling device in a rolling mill.

Referring now to the drawings and with initial reference to FIG. 1, a chain guide embodying the concepts of the present invention is shown at 10 positioned directly upstream from a reeling device 12. Hot rolled product, such as for example ⅝ inch diameter bar, is guided by water cooled delivery pipes 14 from the last roll stand of the mill (not shown) through the chain guide 10 and then on to the reeling device 12. In actual practice, the overall distance between the reeling device and the last roll stand is normally in the range of about 100 feet. By way of example, when the mill is rolling ⅝ inch stock, the delivery speed at the last roll stand may be in the range of 2,500 to 3,500 feet per minute.

Referring now to the remainder of the drawings, it can be seen that the apparatus 10 includes a base 16 suitably adapted to be mounted at a fixed location adjacent the path of stock travel. Base 16 includes a pair of upstanding spaced parallel support members 18a and 18b. As is best shown in FIGS. 4 and 6, the support members are suitably apertured as at 20 to pivotally receive the cylindrical lower ends 21 of two intermediate links 22a and 22b. Each intermediate link is in turn provided with a rib section 24 connecting its cylindrical lower end 21 to an upper cylindrical end 26. The upper cylindrical ends 26 of both intermediate links 22a and 22b are pivotally interconnected by means of an additional pair of spaced parallel connecting links 28a and 28b. Sleeve bearings 30 are provided between the cylindrical lower ends 21 and the support members 18a and 18b, as well as between the cylindrical upper ends 26 and the links 28a and 28b in order to facilitate pivotal movement of the intermediate links 22a and 22b relative to both the stationary support members 18a and 18b and the links 28a and 28b. The foregoing arrangement therefore provides a 4-bar linkage comprised of stationary support members 18a and 18b, intermediate links 22a and 22b, and upper connecting links 28a and 28b.

A pair of sprocket shafts 32a and 32b are journalled by means of roller bearing assemblies 33 for rotation in the cylindrical lower ends 21 of the intermediate links 22a and 22b. Lower sprockets 34 are keyed as at 36 to the reduced diameter ends 38 of sprocket shafts 32a and 32b and are held axially thereon by retainers 40. The upper cylindrical ends 26 of intermediate links 22a and 22b are similarly provided with rotatable sprocket shafts 42a and 42b. Upper sprockets 44 are keyed to shafts 42a and 42b as at 46 and are also held thereon by retainers 40.

The lower sprockets 34 provide the means for supporting a flexible endless drive member which is herein shown in the form of a chain 48a. An identical chain 48b is supported between the upper sprockets 44. The chains are each provided with flat driving surfaces 50.

The means employed for driving chains 48a and 48b can best be understood by reference to FIGS. 2 and 6. The output shaft 52 of a drive motor 54 is connected by means of a coupling 56 to an extension 58 of sprocket shaft 32b. A drive pinion 60 keyed as at 62 to shaft extension 58 meshes with a driven pinion gear 64 keyed as at 66 to an extension 68 of the upper sprocket shaft 42b. The pinions 60 and 64 are enclosed within a housing 70 which is secured by any conventional means such as by bolts 72 to the upper and lower cylindrical ends 26 and 21 of the intermediate links 22b. With this construction, the gear housing 70 will pivot along with link 22b about the rotational axis of shaft 32b, and the drive connection between motor 54 and upper and lower sprocket shafts 42a and 32a will remain uninterrupted, regardless of the angular disposition of link 22b. The pinions 60 and 64, and the sprocket shafts 32b and 42b are lubricated by oil introduced into housing 70 through fill pipe 71.

The chains 48a and 48b are tensioned by means of intermediate sprockets 74a and 74b. As is best shown in FIG. 5, the intermediate sprockets are keyed as at 76 to sprocket shafts 78a and 78b, the latter in turn being journalled eccentrically in cylindrical barrels 80a and 80b. Barrel 80a is rotatable mounted between support members 18a and 18b, and barrel 80b is similarly rotatably mounted between link members 28a and 28b.

Both barrel members 80a and 80b are rotatably adjustable by identical means, a side view of which is provided in FIG. 8 wherein it can be seen that barrel 80b is provided with an end plate 82 having peripheral teeth 84 and a central stud 86. The teeth 84 are arranged to cooperate in locked engagement with a bolt 88 threaded through upper link member 28b. Barrel 80a is provided with an identical end plate 82 having teeth 84 cooperating in locked engagement with a bolt 88 threaded through support member 18b. Rotation of barrel 80a will result in a downward eccentric displacement of sprocket 74a, which in turn will increase the tension in the lower chain 48a. The same result is achieved with upper chain 48b by rotationally adjusting barrel 80b.

Rotation of either barrel 80a or 80b is accomplished in the following manner; the bolt 88 is first removed in order to free the end plate 82. Thereafter, a wrench or other suitable implement is applied to stud 86 and the end plate 82 is rotated until either the intermediate sprocket 74a or 74b has been eccentrically adjusted to achieve the desired tension in the chains. Thereafter, the bolt 88 is again threaded into place to lock the end plate 82 against reverse rotation.

The operating means employed to impart pivotal movement to the intermediate links 22a and 22b and the upper sprockets and chain 48b supported thereon will now be described with particular reference to FIGS. 3 and 7. A piston and cylinder assembly 90 is located between the support members 18a and 18b. The cylinder 90a is pivotally connected to the base 16 as at 92, and the piston rod 90b is pivotally connected as at 94 to the rib section 24 of intermediate link member 22a.

When the piston rod is in an extended position as shown in FIG. 7, the apparatus is in an "inoperative" position with the upper chain 48b spaced above the path of the stock "S" passing thereunder. The upper limit to which the piston rod 90b may be extended is governed by the relative adjustment of a bolt 96 which is threaded through an arm 98 on intermediate link 22a. When the piston rod 90b is extended as shown in FIG. 7, the end of bolt 96 comes into contact with an upstanding stop 100 on fixed base 16.

The apparatus is adjusted to the operative position shown in FIG. 3, with the stock now being gripped between chains 48a and 48b, by retracting piston rod 90b. The extent to which the piston rod may be retracted is governed by a second fixed stop 102 on base 16. A bolt 104 threaded through a laterally extending arm 106 on intermediate link 22b contacts stop 102.

Having thus generally described the embodiment of the invention disclosed in the drawings, some of the advantages to be gained from its operation will now be reviewed briefly. At the outset, when the leading end of a particular product length emerges from the last roll stand and is guided by delivery pipes 14, to reeling device 12, the apparatus 10 is adjusted to the inoperative position shown in FIG. 7, with the upper chain 48b spaced above the path of stock travel. This allows the leading end to pass from the immediately preceding delivery guide 14a through the apparatus and into the next downstream guide 14b without the danger of a cobble being created. Guide members 108a and 108b insure that the stock stays between the chains 48a and 48b while running through the apparatus. The apparatus remains in the inoperative position as long as the length of stock continues to run through the mill. During this period, the rolling action of the mill is sufficient to propel the stock through the delivery pipes and no auxiliary means propelling the stock is required. Motor 54 operates continuously to drive the upper and lower chains 48a and 48b at a linear speed at least equal to the delivery speed of the mill, and the stock "S" simply runs over lower chain 48a, on its way to the downstream reeling device 12. As the tail end of the stock approaches the last mill stand, the piston and cylinder assembly 90 is actuated to retract piston rod 90b, thereby adjusting the apparatus to the operative position shown in FIG. 3. This adjustment, which may be triggered by any conventional sensing device positioned along the mill pass line, lowers the upper chain 48b to a position contacting the stock "S." When this occurs, the stock is gripped between the flat opposed surfaces 50 of the upper and lower chains and propelled forward at mill delivery speed. This auxilliary propelling action continues until the tail end of the stock has passed through the apparatus 10. The frictional resistance in the relatively short section of delivery pipes downstream from the apparatus is insufficient to materially decrease the speed at which the rod is travelling, and accordingly, the entire length of stock is delivered to the reeling device 12 without bending the stock around the reel pins.

It is important to note that when the stock is gripped between the chains 48a and 48b, the upper sprockets 44 are offset along the length of stock travel relative to the lower chain sprockets 34. By maintaining the upper and lower sprockets in this non-opposing relationship, the stock is never gripped between any two rigidly supported drive elements. Instead, the stock is always contacted on at least one side by a flexible tensioned chain. More particularly, stock passing through the apparatus is initially gripped between the upper and lower chains at a point "A" (See FIG. 3). Although at this point the upper chain 48b is rigidly supported on an upper sprocket 44, the oppositely disposed section of the lower chain 48a is between lower sprockets 34 and thus is in a flexible state.

After passing through point "A", the stock is gripped on two sides between the flexible tensioned chains until it arrives at point "B" at which point the condition previously experienced at point "A" is reversed and the stock is gripped between the lower chain 48a which is rigidly supported on a sprocket 34 and a flexible tensioned segment of upper chain 48b.

By employing flexible chains as the driving members, the stock is contacted over a large area, thus making it possible to decrease the pressure being exerted on the stock. This, when combined with the fact that the stock is gripped between two drive members, at least one of which is always in a flexible state, effectively avoids marking the stock surface.

While the invention has been described as an auxiliary drive for the tail ends of product lengths emerging from a rolling mill, it will now be apparent to those skilled in the art that other uses of a generally similar nature may also be served. For example, product other than hot rolled stock can be handled. Also, where appropriate, the invention may be employed to propel an entire length of stock.

It is my intention to cover all changes and modifications of the embodiment herein chosen for purposes of disclosure which do not depart from the spirit and scope of the invention.

I claim:

1. In a rolling mill, apparatus for propelling an elongated hot-rolled product of finite length moving axially along a given path, said apparatus comprising in combination: a base fixed in relation to said path; a plurality of first rotatable elements carried by said base, said first rotatable elements being spaced along a line which is parallel to and on one side of said path; a first endless flexible drive member carried on and supported solely by said first rotatable elements, said first drive member being fixed laterally in relation to said path; fixed laterally spaced guide members cooperating with said first drive member to define a guide channel extending along said path, said first drive member being positioned to provide a moving support for product moving along said path, while said guide members confine the stock and prevent the stock from escaping laterally from said path; link means mounted on and movable pivotally relative to said base; a plurality of second rotatable elements carried by said link means, said second rotatable elements being spaced along a line which is parallel to and on the opposite side of said path; a second endless flexible drive member carried on and supported solely by said second rotatable elements; gear means providing a drive connection between one of said first rotatable elements and one of said second rotatable elements; drive means connected to one of said first rotatable elements for continuously driving said first and second drive members in directions such that the portions of said drive members adjacent to said path will move in the same direction and at a linear speed at least equal to that of a product length moving along said path; and means including a piston-cylinder assembly connected between said link means and said base for adjusting said second drive member between an inoperative position laterally removed from said guide channel and out of contact with a product length moving along said path, and an operative position located between said guide members and in contact with a product length moving along said path, said second rotatable elements being offset along said path relative to said first rotatable elements when said second drive member is in said operative position.

* * * * *